(12) United States Patent
Fukuhara

(10) Patent No.: US 10,838,318 B2
(45) Date of Patent: Nov. 17, 2020

(54) OPTICAL SCANNING APPARATUS AND IMAGE FORMING APPARATUS

(71) Applicant: CANON KABUSHIKI KAISHA, Tokyo (JP)

(72) Inventor: Hiroyuki Fukuhara, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/373,499

(22) Filed: Apr. 2, 2019

(65) Prior Publication Data

US 2019/0332029 A1 Oct. 31, 2019

(30) Foreign Application Priority Data

Apr. 25, 2018 (JP) .................................. 2018-083812

(51) Int. Cl.
*G02B 26/08* (2006.01)
*G03G 15/043* (2006.01)
*G02B 26/12* (2006.01)
*G02B 27/30* (2006.01)
*G02B 27/00* (2006.01)

(52) U.S. Cl.
CPC ....... *G03G 15/043* (2013.01); *G02B 26/0816* (2013.01); *G02B 26/12* (2013.01); *G02B 26/124* (2013.01); *G02B 27/0031* (2013.01); *G02B 27/30* (2013.01)

(58) Field of Classification Search
CPC .. G03G 15/043; G02B 26/0816; G02B 26/12; G02B 26/124; G02B 27/30; G02B 27/0031
See application file for complete search history.

(56) References Cited

U.S. PATENT DOCUMENTS

| 2003/0173508 A1* | 9/2003 | Tanaka | G02B 26/124 250/234 |
| 2006/0045149 A1* | 3/2006 | Kasai | G02B 17/045 372/24 |
| 2006/0098994 A1* | 5/2006 | Tamaru | G02B 26/12 399/17 |
| 2007/0146738 A1* | 6/2007 | Nakajima | B41J 2/473 358/1.4 |

(Continued)

FOREIGN PATENT DOCUMENTS

JP 2016151666 A 8/2016

*Primary Examiner* — David J Bolduc
(74) *Attorney, Agent, or Firm* — Canon U.S.A., Inc. I.P. Division

(57) ABSTRACT

An optical scanning apparatus includes a deflector to deflect laser light emitted from a light source for scanning, and a detection unit attached to a substrate provided with a through-hole for the detection unit to receive laser light that has passed through the through-hole. The substrate is attached to an optical box that is to store the deflector. The detection unit detects the laser light to control an irradiation position on a scanned surface of the laser light reflected by the deflector. The optical box is provided with a passing portion to guide the laser light emitted from the light source to the detection unit, and protruded portions disposed around the passing portion and protruded toward the substrate side. The substrate is attached to the optical box in a state where the protruded portions are engaged with walls forming the through-hole.

11 Claims, 11 Drawing Sheets

(56) References Cited

U.S. PATENT DOCUMENTS

| | | | |
|---|---|---|---|
| 2009/0052944 A1* | 2/2009 | Kubo | B41J 2/473 |
| | | | 399/220 |
| 2009/0060583 A1* | 3/2009 | Amada | B41J 2/473 |
| | | | 399/221 |
| 2010/0060963 A1* | 3/2010 | Miyake | G02B 26/127 |
| | | | 359/197.1 |
| 2010/0183337 A1* | 7/2010 | Kubo | B41J 2/45 |
| | | | 399/220 |
| 2013/0033557 A1* | 2/2013 | Lim | B41J 2/471 |
| | | | 347/224 |
| 2013/0222513 A1* | 8/2013 | Nakano | G02B 26/127 |
| | | | 347/250 |
| 2015/0268581 A1* | 9/2015 | Yamazaki | G03G 15/5033 |
| | | | 347/118 |
| 2016/0238965 A1* | 8/2016 | Nagatoshi | G03G 15/04036 |
| 2017/0123339 A1* | 5/2017 | Takano | B41J 2/47 |

\* cited by examiner

OPTICAL SCANNING APPARATUS AND IMAGE FORMING APPARATUS

BACKGROUND

Field of the Disclosure

The present disclosure relates to an image forming apparatus such as a copying machine, printer, and facsimile machine, and to an optical scanning apparatus used for the image forming apparatus.

Description of the Related Art

An optical scanning apparatus used for an image forming apparatus such as a copying machine, printer, and facsimile machine optically modulates laser light emitted from a light source based on an image signal, and deflects the optically modulated laser light for scanning by using, for example, a deflector having a rotating polygon mirror. The deflected laser light for scanning is focused on the surface of a photosensitive drum by a scanning lens such as fθ lens to form an electrostatic latent image. Subsequently, a development device supplies a developer to the electrostatic latent image formed on the surface of the photosensitive drum to develop the electrostatic latent image into a visualized toner image. The toner image is transferred onto a recording medium such as paper which is then sent to a fixing device. The fixing device heats the toner image on the recording medium to fix the toner image thereto, thus accomplishing printing.

The optical scanning apparatus deflects the laser light emitted from the light source and performs scanning, by using a deflector having a rotating polygon mirror. The optical scanning apparatus controls the position for starting image writing by the laser light reflected by reflection surfaces of the rotating polygon mirror. More specifically, the optical scanning apparatus controls the irradiation position to be irradiated with the laser light, of the photosensitive drum. Therefore, the optical scanning apparatus includes a substrate mounting a beam detect (BD) sensor as a detection unit for receiving laser light and generating a horizontal synchronization signal for controlling the irradiation position to be irradiated with the laser light. The horizontal synchronization signal from the BD sensor as a detection unit serves as a reference of the position for starting image writing of the photosensitive drum in the main scanning direction. Therefore, if the position of the BD sensor deviates from an ideal position, the timing of the image signal also deviates, resulting in an image deviation in the main scanning direction. Therefore, it is necessary to position the BD sensor with respect to a predetermined or desired position of an optical box with high accuracy. Japanese Patent Application Laid-Open No. 2016-151666 discusses a technique for improving the positional accuracy of a BD sensor with respect to a substrate.

However, the technique discussed in Japanese Patent Application Laid-Open No. 2016-151666 improves the positional accuracy of the BD sensor based on a phenomenon in which cream solder pre-applied to the substrate is flowed in a reflow furnace, the cream solder melts, and the surface tension of the melted cream solder causes self-alignment. Although the BD sensor is positioned with high accuracy with respect to a copper pattern applied with cream solder, a positional error of the copper pattern will be included in the positional accuracy of the BD sensor with respect to the substrate. In addition, a positional accuracy error in fixing the substrate to an optical box will also be included in the positional accuracy of the BD sensor. The positional accuracy between the BD sensor and the optical box may possibly be subjected to a large variation.

SUMMARY

The present disclosure is directed to providing an optical scanning apparatus in which a detection unit for detecting laser light is accurately attached to an optical box, to control an irradiation position on a scanned surface.

According to an aspect of the present disclosure, an optical scanning apparatus includes a light source configured to emit laser light, a deflector configured to deflect the laser light emitted from the light source for scanning, a detection unit configured to detect the laser light to control an irradiation position on a scanned surface of the laser light reflected by the deflector, a substrate with the detection unit attached to the substrate, and an optical box to which the substrate is attached, configured to store the deflector, wherein the substrate is provided with a through-hole, wherein the detection unit is attached to the substrate to receive laser light that has passed through the through-hole, wherein the optical box is provided with a passing portion for guiding the laser light emitted from the light source to the detection unit, and protruded portions disposed around the passing portion and protruded toward the substrate side, and wherein the substrate is attached to the optical box in a state where the protruded portions are engaged with walls forming the through-hole.

Further features of the present disclosure will become apparent from the following description of embodiments with reference to the attached drawings.

DESCRIPTION OF THE EMBODIMENTS

Embodiments for embodying the present disclosure will be illustratively described in detail below with reference to the accompanying drawings. However, sizes, materials, shapes, and relative arrangements of elements described in the embodiments are not limited thereto and are to be modified as required depending on the configuration of an apparatus according to the present disclosure and other various conditions. The scope of the present disclosure is not limited to the embodiments described below.

A configuration of an image forming apparatus having an optical scanning apparatus according to a first embodiment will be described below with reference to FIGS. 1 to 7.

<Image Forming Apparatus>

Figure 1:
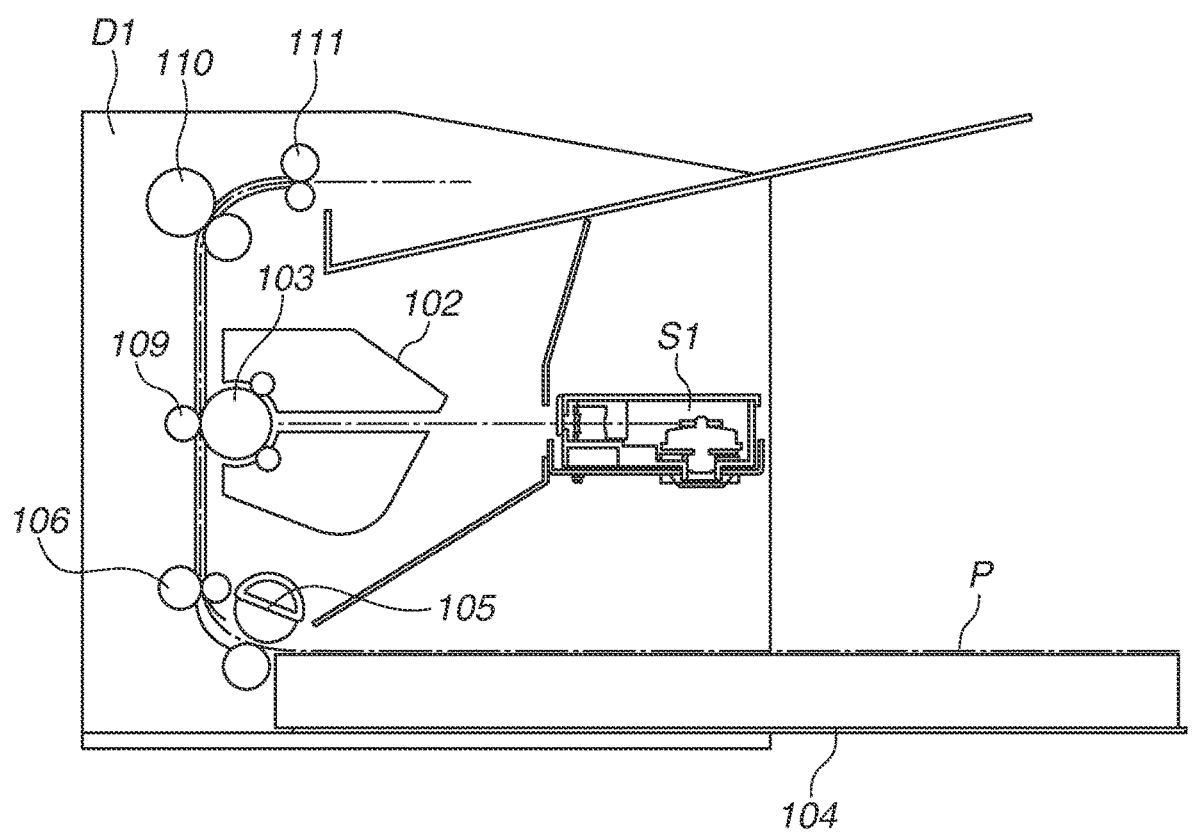
FIG. 1 is a cross-sectional view schematically illustrating a configuration of an image forming apparatus including an optical scanning apparatus.

A configuration of an image forming apparatus D1 will be described below with reference to FIG. 1. FIG. 1 is a cross-sectional view schematically illustrating the image forming apparatus D1.

The image forming apparatus D1 including an optical scanning apparatus S1 that scans the scanned surface of a scanned member such as a photosensitive drum performs image formation on a recording medium P such as a recording sheet based on a scanned image. As illustrated in FIG. 1, the image forming apparatus D1 emits laser light based on image information from the optical scanning apparatus S1 to irradiates the surface of a photosensitive drum 103 as a scanned member built in a process cartridge 102. When the surface of the photosensitive drum 103 is irradiated with and exposed to the laser light, a latent image is formed on the photosensitive drum 103. The latent image formed on the photosensitive drum 103 is visualized into a toner image with toner. Therefore, the photosensitive drum 103 also serves as an image bearing member. The process cartridge 102 according to the present embodiment integrally includes the photosensitive drum 103, a charging device, and a development device. The charging device and the development device serve as process units for acting on the photosensitive drum 103.

The cartridge is not limited to the process cartridge configuration. Examples of other cartridge configurations include a developer container (such as a toner cartridge) for storing developer and a development device (such as a development cartridge) having at least a developer bearing member.

Meanwhile, the recording media P stored in a sheet paper cassette 104 are separated and fed one by one by a feed roller 105 and then conveyed toward the downstream side by a conveyance roller 106. The toner image formed on the photosensitive drum 103 is transferred onto the recording medium P by a transfer roller 109. More specifically, an image is formed on the recording medium P by using a toner image on the photosensitive drum 103 as a scanned member. The recording medium P with the toner image formed thereon, is further conveyed toward the downstream side, and then heated by a fixing device 110 including a heater. Then, the toner image is thermally fixed onto the recording medium P. Subsequently, the recording medium P is discharged out of the image forming apparatus D1 by a discharge roller 111. Although the image forming apparatus D1 according to the present embodiment is a monochrome image forming apparatus, the image forming apparatus D1 may also be a full color laser beam printer.

<Optical Scanning Apparatus>

Figure 2:
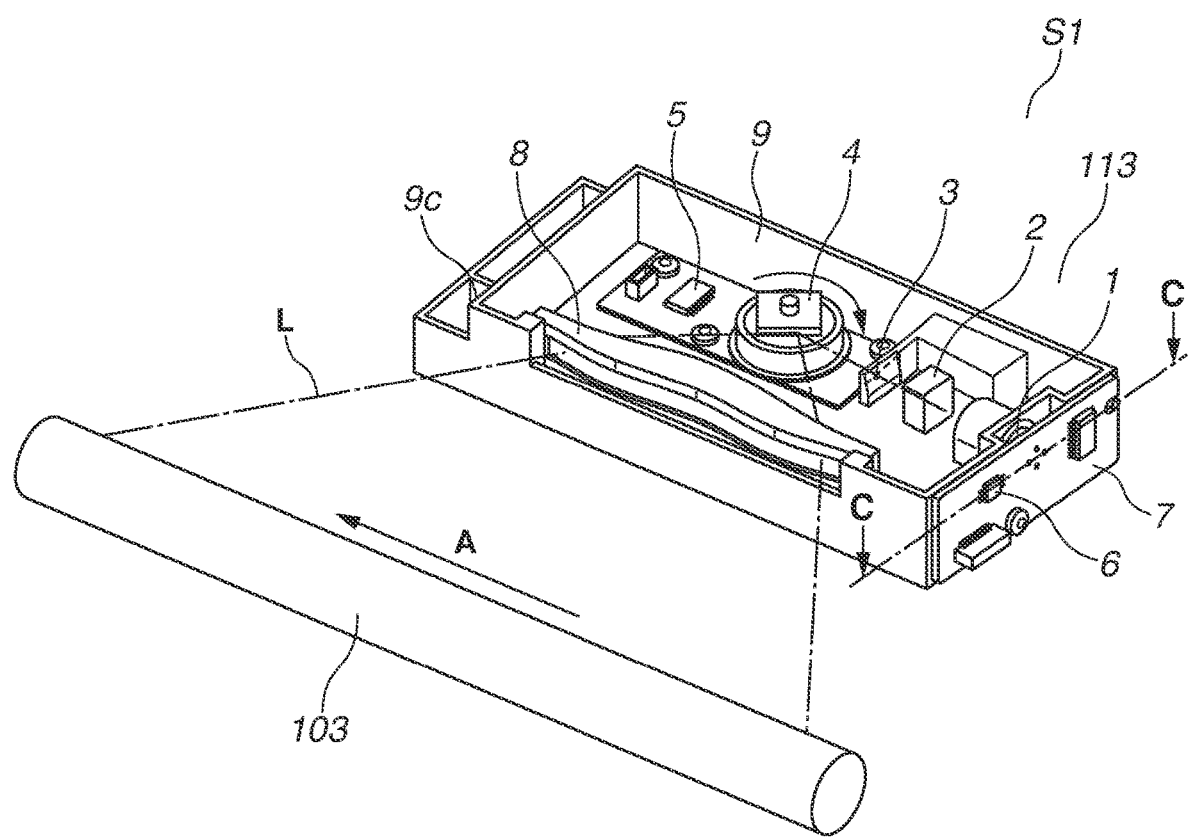
FIG. 2 is a perspective view illustrating a configuration of an optical scanning apparatus according to a first embodiment.

A configuration of the optical scanning apparatus S1 will be described below with reference to FIG. 2. FIG. 2 is a perspective view illustrating the configuration of the optical scanning apparatus S1.

Referring to FIG. 2, a semiconductor laser unit 1 serves as a light source for emitting laser light L. An anamorphic collimator lens 2 has a function of a collimator lens and a function of a cylindrical lens. An aperture 3 serves as an optical diaphragm for changing the cross-sectional shape of the laser light L to a predetermined shape. A rotating polygon mirror 4 reflects the laser light L. A deflector 5 includes a circuit for driving the rotation of the rotating polygon mirror 4. According to the present specification, the configuration of the deflector 5 includes the rotating polygon mirror 4. A beam detect (BD) sensor 6 serves as a detection unit for detecting the irradiation position on the scanned surface by using the laser light L reflected by the rotating polygon mirror 4. A substrate 7 is electrically connected with a semiconductor laser unit 1. An fθ lens 8 focuses the laser light L reflected by the rotating polygon mirror 4 on the photosensitive drum 103 at a constant speed. An optical box 9 stores the semiconductor laser unit 1, the anamorphic collimator lens 2, the aperture 3, the deflector 5 for driving the rotation of the rotating polygon mirror 4, and the fθ lens 8. An opening 9c provided at the top of the optical box 9 is covered by a lid.

In the optical scanning apparatus S1 illustrated in FIG. 2, the semiconductor laser unit 1 emits the laser light L based on an image signal received by the substrate 7. The anamorphic collimator lens 2 changes the laser light L to parallel light in the main scanning cross section and changes the laser light L to converged light in the sub scanning cross section. Parallel light contains weak converged light and weak divergent light. Then, when the laser light L passes through the aperture 3, the cross section is shaped into a predetermined shape and then focused on each reflection surface of the rotating polygon mirror 4 in a focal line shape extending in the main scanning direction. When the rotating polygon mirror 4 is rotated at a constant angular velocity, the laser light L is deflected for scanning. The laser light L deflected for scanning by the rotating polygon mirror 4 enters the light receiving surface of the BD sensor 6 mounted on the substrate 7. At this timing, the BD sensor 6 detects the position fir starting image writing by the laser light L on the surface of a photosensitive drum in the main scanning direction and outputs a BD signal based on the timing of detection. More specifically, the BD sensor 6 detects a laser signal for controlling the irradiation position of the laser light L on the scanned surface of the scanned member and outputs a BD signal based on the timing of detection.

The BD signal is output for each surface of the rotating polygon mirror 4 and serves as a trigger signal of control for arranging the position for starting image writing on the scanned surface in the main scanning direction.

Then, the laser light L penetrates the fθ lens 8 as scanning light and enters the surface of the photosensitive drum 103. The fθ lens 8 is an image focusing optical element. The fθ lens 8 focuses the laser light L on the photosensitive drum 103 at a constant speed to form an image in a predetermined spot-like shape.

Main scanning is performed when the laser light L is deflected for scanning by the rotation of the rotating polygon mirror 4, and the laser light L scans the photosensitive drum 103 in the direction of an arrow A. Sub scanning is performed when the photosensitive drum 103 is driven to rotate around the axis line of the cylinder. In this way, an electrostatic latent image based on image information is formed on the surface of the photosensitive drum 103.

<Configurations of Substrate and BD Sensor>

Figure 3A:
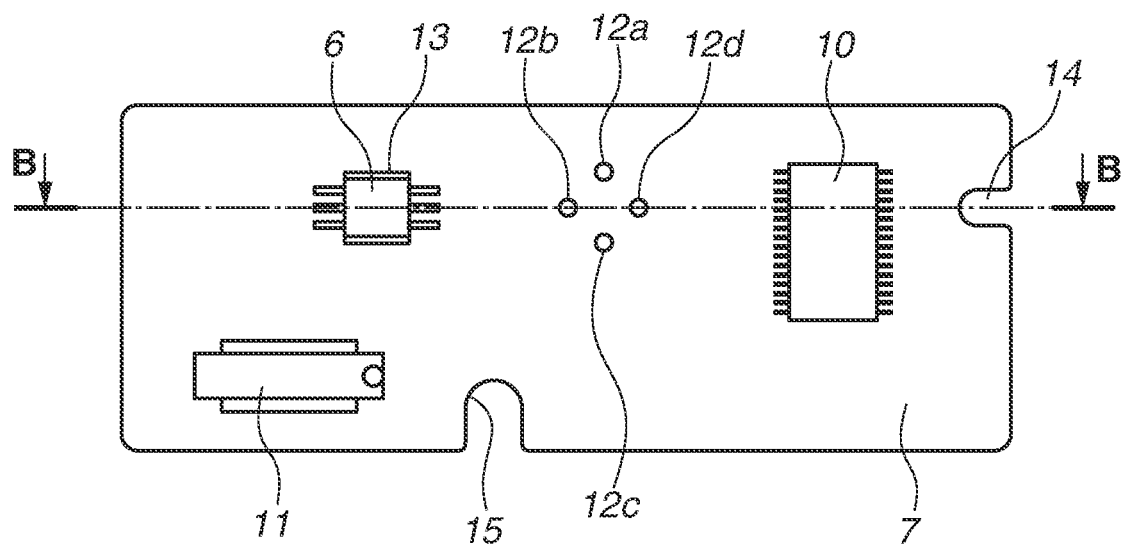
FIG. 3A is a front view illustrating a configuration of a substrate.
Figure 3B:
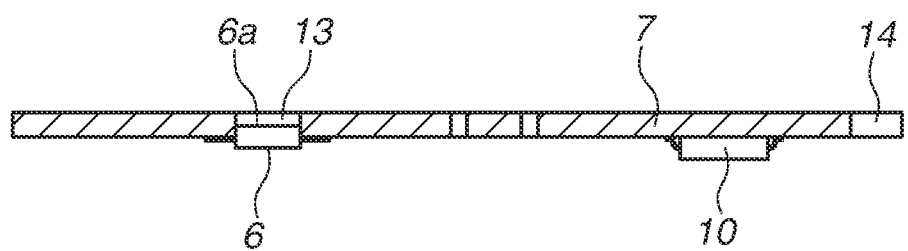
FIG. 3B is a cross-sectional view illustrating the configuration of the substrate, taken along the B-B line illustrated in FIG. 3A.

A configuration of the substrate 7 will be described below with reference to FIGS. 3A and 3B. FIG. 3A is a front view illustrating the substrate 7 according to the present embodiment, and FIG. 3B is a cross-sectional view illustrating the configuration of the substrate 7, taken along the B-B line illustrated in FIG. 3A. Referring to FIGS. 3A and 3B, the BD sensor 6 is the above-described detection unit. A driver integrated circuit (IC) 10 is a control unit for controlling the drive of the semiconductor laser unit 1 as a light source. A signal transmission connector 11 electrically connects the substrate 7 with a circuit on the side of the apparatus main body other than the substrate 7. Terminals of the semiconductor laser unit 1 are inserted into through-holes 12a to 12d. The terminals of the semiconductor laser unit 1 enter the through-holes 12a to 12d to make electrical connection with the circuit on the substrate 7. A through-hole 13 captures the laser light L to the BD sensor 6. A detent notch 14 positions the substrate 7 with respect to the optical box 9. A fixing portion 15 fixes the substrate 7 to the optical box 9 with a screw.

As illustrated in FIG. 3B, a projection 6a as the package of the BD sensor 6 as a detection unit is fit into the through-hole 13 in the main scanning direction. As illustrated in FIG. 3B, when the projection 6a contacts the inner wall of the through-hole 13, the BD sensor 6 is positioned while being regulated in horizontal movement. More specifically, the configuration positions the BD sensor 6 in the main scanning direction with respect to the substrate 7 corresponding to the main scanning direction on the scanned surface. The BD sensor 6 is fixedly attached to the substrate 7 to make electrical connection through reflow soldering. Reflow soldering refers to soldering by heating and melting solder pre-applied at normal temperature. Fitting the projection 6a into the through-hole 13 allows accurately positioning the BD sensor 6 with respect to the through-hole 13 in the main scanning direction. The laser light detection surface on the side of the projection 6a can receive the laser light L incident to the through-hole 13. Along the line connecting the semiconductor laser unit 1 as a light source and the BD sensor 6 as a detection unit (for example, the B-B line illustrated in FIG. 3A), the signal transmission connector 11, the BD sensor 6, the semiconductor laser unit 1, and the driver IC 10 are disposed in this order. Since the semiconductor laser unit 1 and the BD sensor 6 which are demanded for predetermined or highly positional accuracy are disposed near a positioning member, the semiconductor laser unit 1 and the BD sensor 6 are disposed at the center along the line connecting the semiconductor laser unit 1 and the BD sensor 6. As also illustrated in FIG. 3B, the semiconductor laser unit 1 and the driver IC 10 are disposed on different substrate surfaces so as to sandwich the substrate 7. The terminals of the BD sensor 6 to be electrically connected with the circuit are also disposed on the substrate surface on the side where the driver IC 10 is disposed.

<Configurations of Substrate, BD Sensor, and Optical Box>

Figure 4:
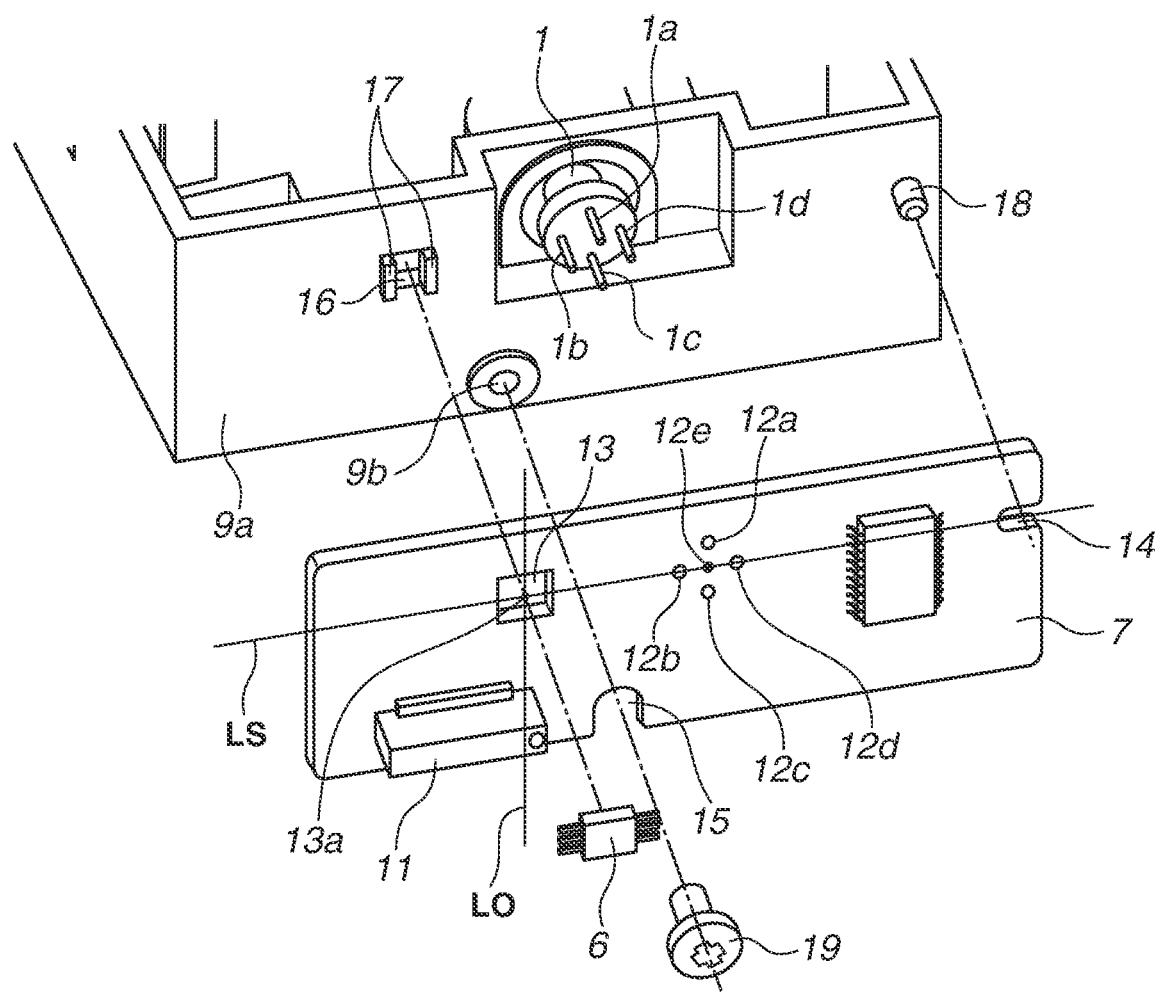
FIG. 4 is an exploded perspective view illustrating a positional relation between the substrate and an optical box according to the first embodiment.
Figure 5:
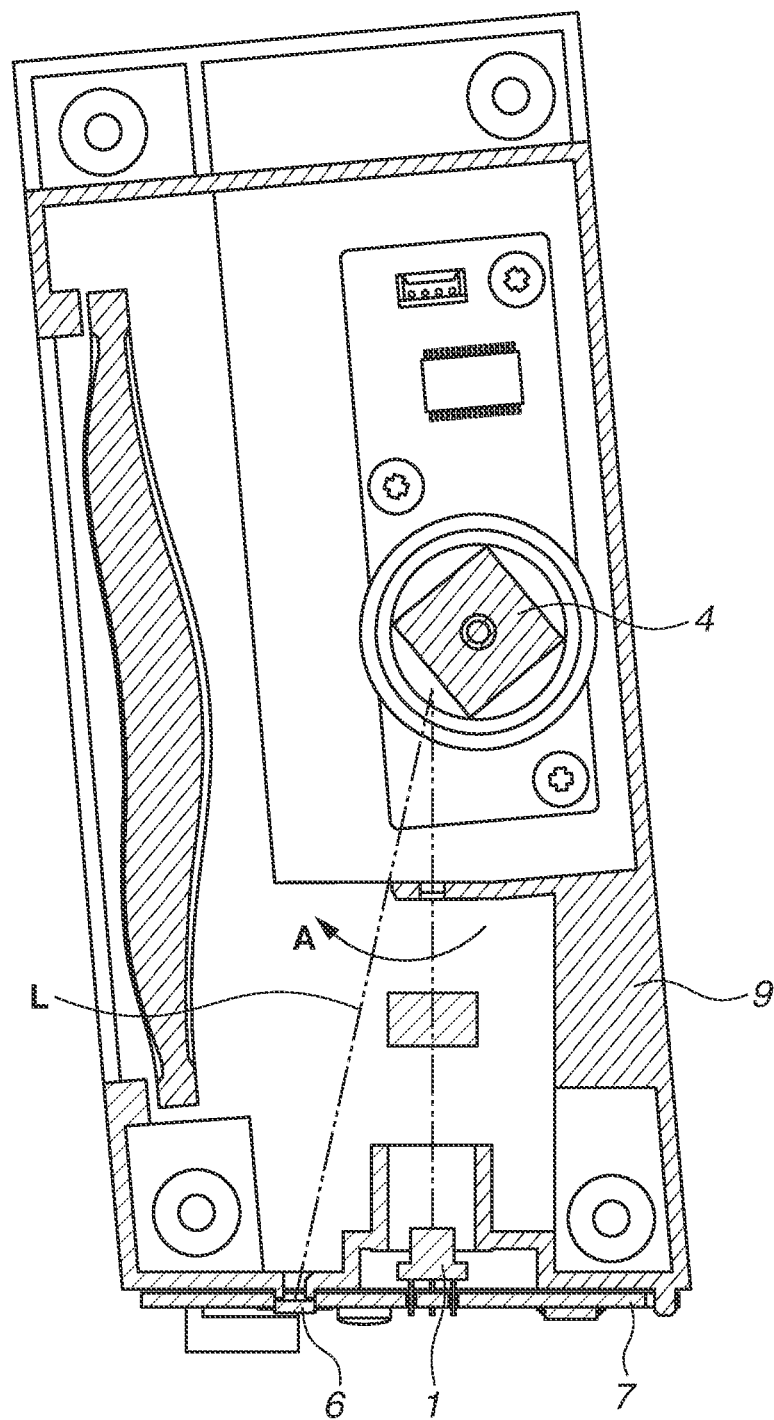
FIG. 5 is a cross-sectional view illustrating the positional relation between the substrate and the optical box according to the first embodiment, taken along the C-C line illustrated in FIG. 2.
Figure 6:
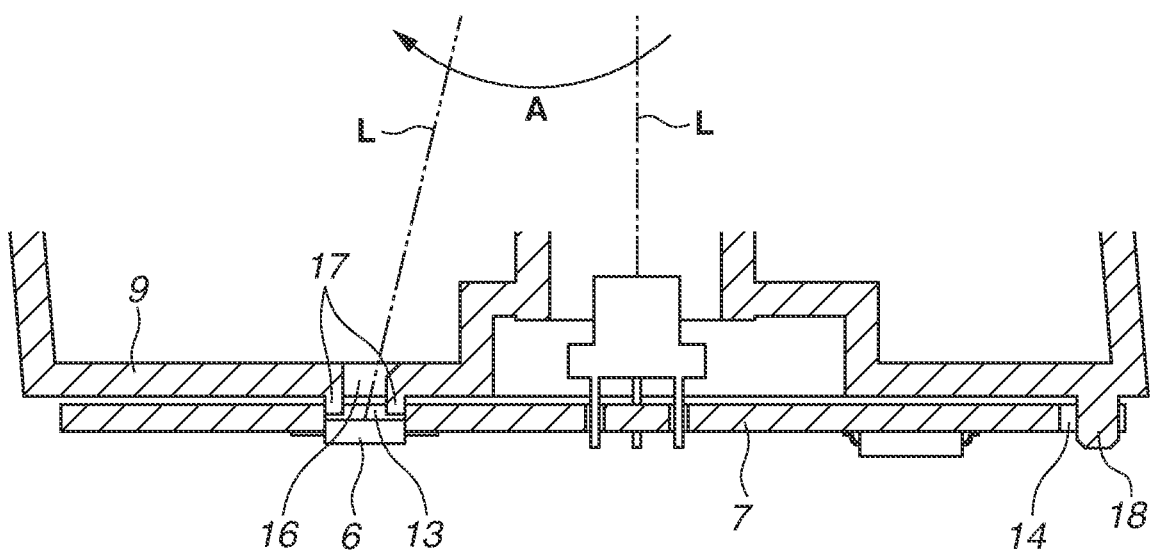
FIG. 6 is a partial detail view illustrating the positional relation illustrated in FIG. 5.

Configurations of the substrate 7, the BD sensor 6, and the optical box 9 according to the present embodiment will be described below with reference to FIGS. 4 to 6. FIG. 4 is an exploded perspective view illustrating configurations of the substrate 7 and the optical box 9 according to the present embodiment. FIG. 5 is a cross-sectional view illustrating configurations of the substrate 7, the optical box 9, and the BD sensor 6 according to the present embodiment, taken along the C-C line on the optical scanning apparatus S1 illustrated in FIG. 2. FIG. 6 is a partial detail view illustrating the configuration illustrated in FIG. 5.

Referring to FIG. 4, a through-hole 16 is provided in a side wall 9a of the optical box 9 in order to capture the laser light L to the BD sensor 6. Although, in the present embodiment, the through-hole 16 is an opening, the through-hole 16 is not limited thereto and may be any structure for transmitting light. For example, the through-hole 16 may be a structure filled with a transparent material for transmitting light. Therefore, in the present specification, the through-hole 16 is one of passing portions.

First positioning members 17 are positioning projections for positioning the substrate 7. The first positioning members 17 are projections protruded from the optical box 9 to the outside. These projections include portions around the opening and portions protruded from the optical box 9 toward the side of the substrate 7 to be attached thereto. These projections may have a wall surface continuously formed from the inner wall of the opening. More specifically, the projections may be shaped in such a way that the edge of the opening is thickly formed. A second positioning member 18 serves as a detent boss for positioning the substrate 7. A screw 19 serves as a fixing member.

As illustrated in FIG. 4, the positioning projections 17 of the optical box 9 are fit into the through-hole 13 of the substrate 7 while in contact with the inner wall of the through-hole 13. Then, the substrate 7 is positioned and attached to the optical box 9. The positioning projections 17 protruded from the optical box 9 toward the side of the substrate 7 are engaged with the substrate 7 while in contact with the wall of the through-hole 13 of the substrate 7. When the substrate 7 is attached to the optical box 9, the leading edges of the positioning projections 17 is positioned within the through-hole 13 of the substrate 7. The positioning projections 17 as protruded portions are shorter than the diameter of the through-hole when viewed from a direction (described below). When the direction of comparison is a direction LO perpendicularly intersecting with a straight line LS connecting a position 12e of the substrate 7 corresponding to the center of the light source (when the light source is fixed) and a position 13a within the through-hole 13 corresponding to the center of the detection unit (when the detection unit is fixed), Although the BD sensor 6 is actually mounted on the substrate 7, FIG. 4 illustrates a state where the BD sensor 6 is separated from the substrate 7 for the sake of description. When the detent boss 18 is fit into the detent notch 14 of the substrate 7, the substrate 7 is positioned with respect to the optical box 9. In this case, terminals 1a to 1d of the semiconductor laser unit 1 are inserted into the through-hole 12a to 12d, respectively, disposed on the substrate 7. Subsequently, the semiconductor laser unit 1 is connected to the substrate 7 at four positions through soldering to make electrical conduction with the circuit. The substrate 7 is fixed when the fixing screw 19 is screwed into a fixing seat surface 9b of the optical box 9 through the fixing portion 15.

FIG. 5 is a cross-sectional view illustrating the optical scanning apparatus S1 after the substrate 7 is fixed to the optical box 9. As illustrated in FIG. 5, the laser light L emitted from the semiconductor laser unit 1 is used for scanning in the direction of the arrow A (main scanning) by the rotating polygon mirror 4 and enters the BD sensor 6.

According to the present embodiment, the laser light L emitted from the semiconductor laser unit 1 perpendicularly intersects with the attachment surface of the substrate 7 to which the terminals of the semiconductor laser unit 1 are attached. When the laser light L reflected by the rotating polygon mirror 4 advances straight toward the BD sensor 6, the laser light L does not perpendicularly intersect with the attachment surface but obliquely intersects with the attachment surface.

A configuration of the vicinity of the BD sensor 6 will be described in detail below with reference to FIG. 6.

As illustrated in FIG. 6, the laser light L reflected by the rotating polygon mirror 4 passes through the through-hole 16 of the optical box 9 and the through-hole 13 of the substrate 7, and enters the BD sensor 6. As described above with reference to FIG. 4, the positioning projections 17 provided on the optical box 9 come in contact with and fit into the inner wall of the through-hole 13 provided in the substrate 7. Thus, the substrate 7 is positioned in the main scanning direction of the optical box 9 and substrate 7 corresponding to the main scanning direction on the scanned surface. Since the positioning projections 17 provided on the optical box 9 and the BD sensor 6 are fit into the through-hole 13 and positioned, the BD sensor 6 can be positioned to the optical box 9 with high accuracy.

Comparative Example

Figure 7:
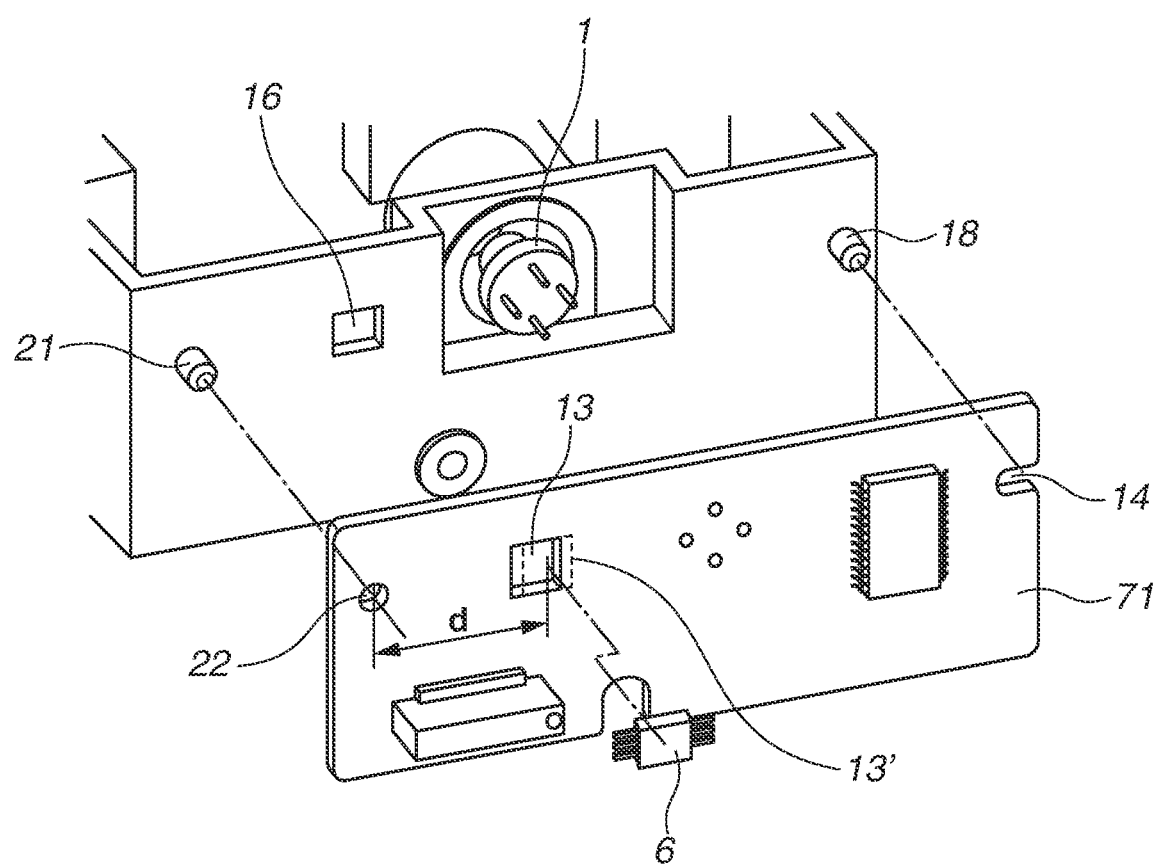
FIG. 7 is an exploded perspective view illustrating a positional relation between a substrate and an optical box according to a comparative example.

FIG. 7 is an exploded perspective view illustrating a positioning method used when positioning the substrate 7 to the optical box 9 according to a comparative example. Instead of fitting by the through-hole 13, this method uses fitting by a boss and a through-hole generally used for positioning of a machine part.

FIG. 7 illustrates a positioning boss 21 and a positioning hole 22. When the positioning boss 21 is fit into the positioning hole 22, and the detent boss 18 is fit into the detent notch 14, the substrate 71 is positioned to the optical box 9. However, a distance d from the positioning boss 21 to the through-hole 13 of the substrate 71 varies in the manufacturing process. If the through-hole 13 deviates to a position 13' drawn with dashed lines, for example, the BD sensor 6 will be fit into the through-hole drawn with dashed lines and accordingly fixed to the optical box 9 being deviated from a predetermined or desired position. A video signal is output in synchronization with the timing for starting image writing which comes when a fixed time period has elapsed since the BD signal was output from the BD sensor 6. Therefore, if the BD sensor 6 deviates from the predetermined or desired position, the position for starting image writing will also deviate. This shifts the irradiation position on the scanned surface of the photosensitive drum 103. Thus, horizontal margins in the image printed on the recording medium P become larger or smaller than the ideal width. According to the present embodiment, as illustrated in FIG. 6, even if the position of the through-hole 13 of the substrate 7 deviates from the predetermined or desired position, the optical box 9 and the BD sensor 6 are positioned to the through-hole 13 at the deviated position, making it possible to restrain the deviation of the position for starting image writing. According to the present embodiment, the expression of the positional deviation is exaggerated.

This makes it possible to restrain the positional deviation of the BD sensor 6 for generating the BD signal and prevent a deviation of the timing for generating the BD signal for controlling the position for starting image writing, thus achieving image formation with a position for starting image writing stable.

Figure 8:
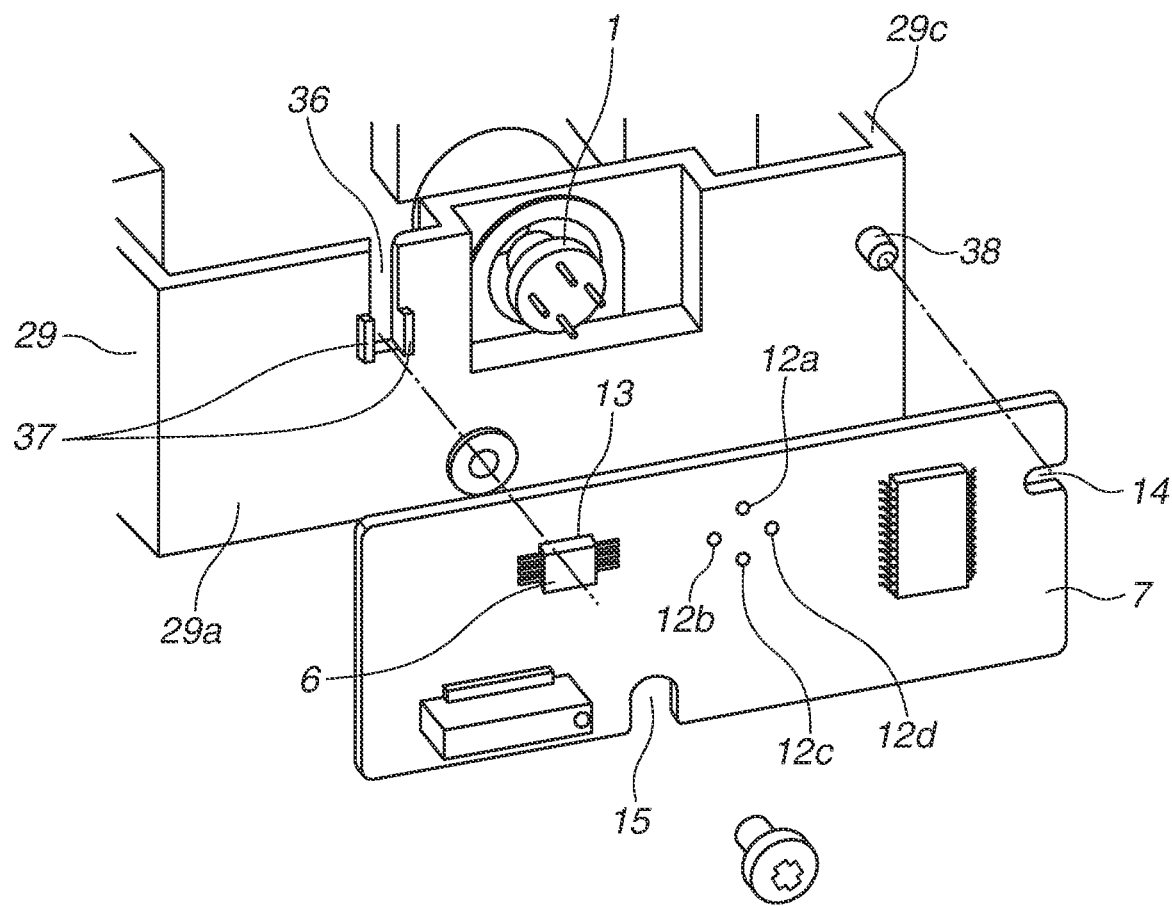
FIG. 8 is a perspective view illustrating a configuration of an optical scanning apparatus according to a second embodiment.
Figure 9:
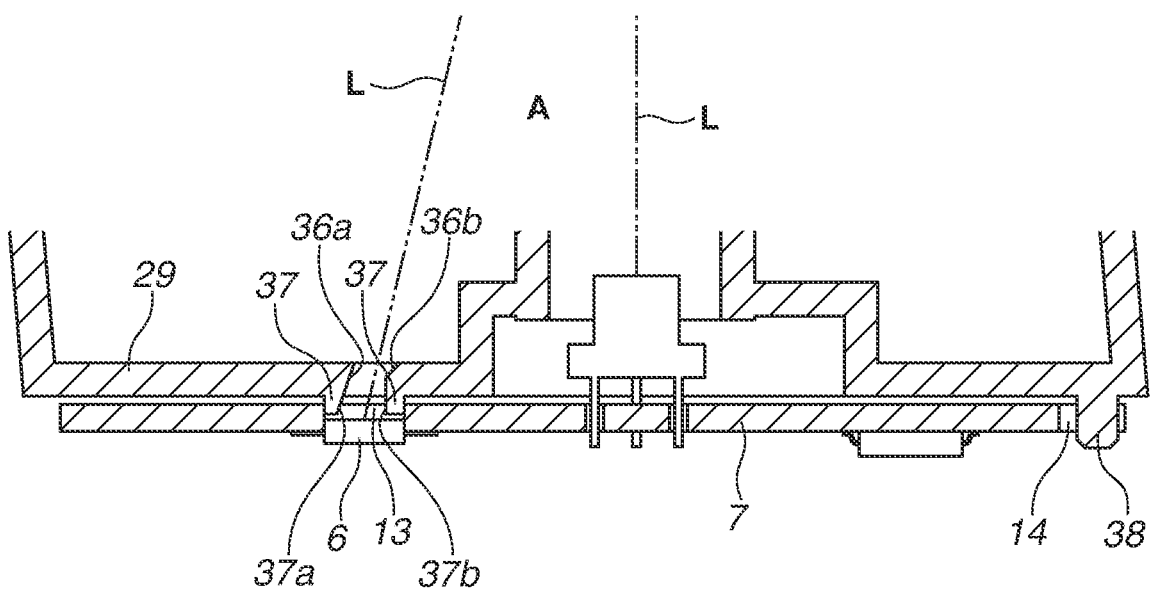
FIG. 9 is a partial detail view illustrating the configuration of the optical scanning apparatus according to the second embodiment.

A configuration of the image forming apparatus including an optical scanning apparatus according to a second embodiment will be described below with reference to FIGS. 8 to 10A and 10B. Configurations identical to those in the first embodiment are assigned the same reference numerals, and redundant descriptions thereof will be omitted. FIG. 8 is an exploded perspective view illustrating configurations of the substrate 7 and an optical box 29 according to the second embodiment. FIG. 9 is a fragmentary cross-sectional view illustrating configurations of the substrate 7, the optical box 29, and the BD sensor 6 according to the second embodiment.

The present embodiment illustrated in FIG. 8 differs from the first embodiment illustrated in FIG. 4 in that a notch 36 provided in a side wall 29a of the optical box 29 serves as a passing portion for capturing the laser light L to the BD sensor 6. Although the through-hole 16 serves as a passing portion in FIG. 4, the notch 36 is used in the present embodiment in consideration of the formability of the optical box 29 made of resin.

The present embodiment illustrated in FIG. 9 differs from the first embodiment illustrated in FIG. 6 in that the optical path for capturing the laser light L to the BD sensor 6 has a cross-sectional shape. As illustrated in FIG. 9, according to the present embodiment, the cross-sectional shape of a side wall 37a of the positioning projections 37 as protruded portions on the optical path side is parallel to the angle of the incident light L to the BD sensor 6. More specifically, the side wall 37a is provided in parallel with the straight traveling direction in which the laser light L advances straight to the BD sensor 6. The positioning projections 37 as protruded portions are formed around the notch 36. Therefore, like the side wall 37a of the positioning projections 37, an inner wall 36a of the notch 36 is also formed in parallel with the angle of the incident light L to the BD sensor 6. According to the present embodiment, the side wall 37a of the positioning projections 37 and the inner wall 36a of the notch 36 form a continuous wall and are parallel to the angle of the incident light to the BD sensor 6. The side wall 37a of the positioning projections 37 and the inner wall 36a of the notch 36 are parallel to the laser light L, and therefore do not perpendicularly intersect with the line connecting the light source and the detection unit but obliquely intersects with the line. Of the inner walls forming the notch 36, the inner wall 36a is referred to as a first inner wall 36a, and the inner wall facing the first inner wall 36a is referred to as a second inner wall 36b. The second inner wall 36b may also include a wall or surface parallel to the laser light L. According to the present embodiment, the second inner walls 36b is partially formed of a surface parallel to the laser light L and partially formed of a surface intersecting with the line. According to the present embodiment, the notch 36 is formed to avoid an undercut-shaped optical path and a complicated mold structure.

Figure 10A:
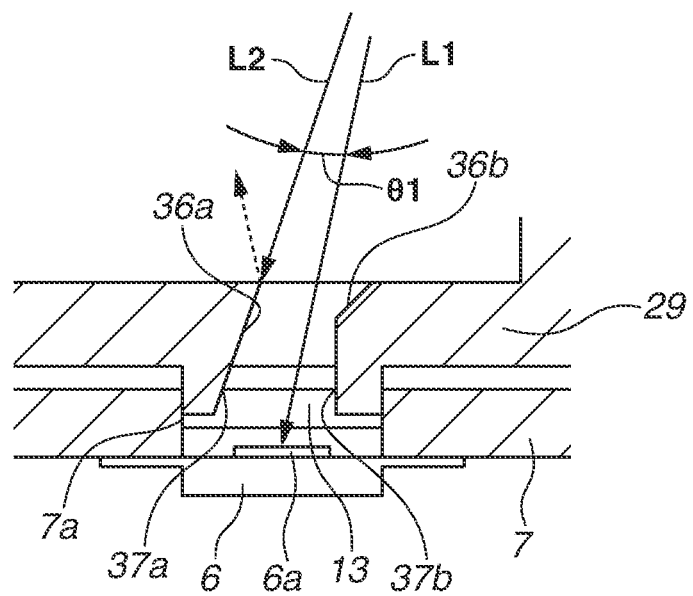
FIG. 10A is a fragmentary cross-sectional view illustrating a configuration around a beam detect (BD) sensor as a detection unit according to the second embodiment.
Figure 10B:
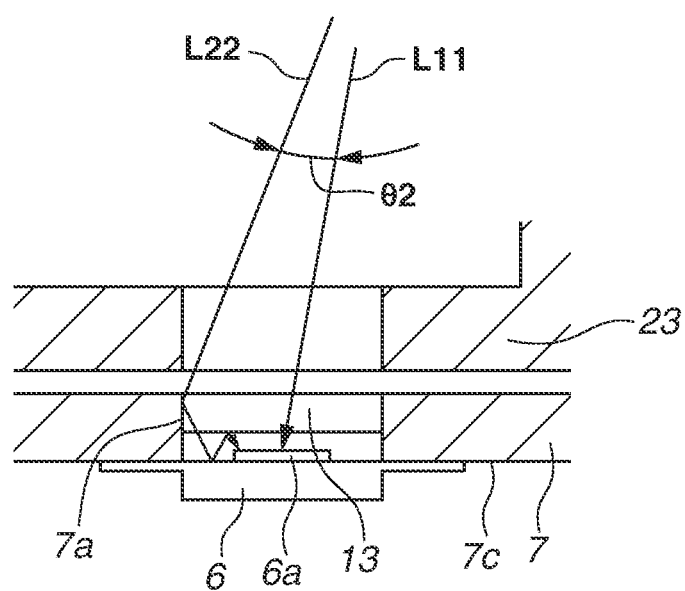
FIG. 10B is a fragmentary cross-sectional view illustrating a configuration around a BD sensor according to the comparative example.
Figure 11A:
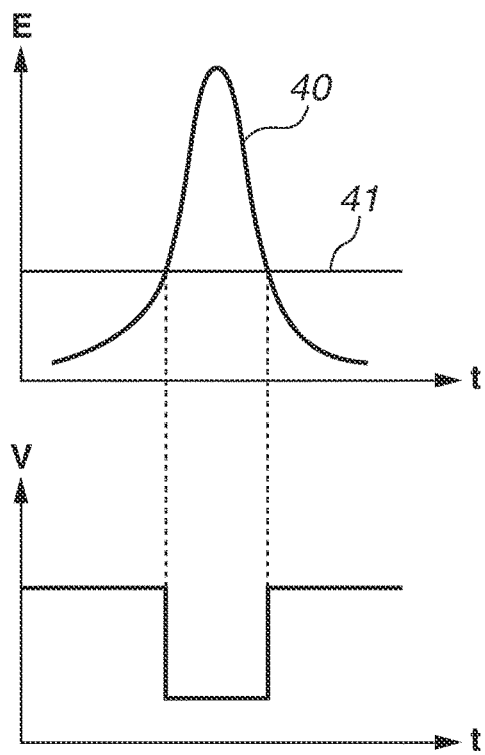
FIG. 11A illustrates a waveform of a horizontal synchronization signal and a pulse signal according to the second embodiment.

Effects of the configuration according to the present embodiment will be described below with reference to FIGS. 10A, 10B, 11A, and 11B. FIG. 10A is a fragmentary cross-sectional view illustrating the periphery of the BD sensor 6 according to the present embodiment. FIG. 10B is a fragmentary cross-sectional view illustrating the periphery of the BD sensor 6 according to the comparative example of the first embodiment illustrated in FIG. 7. FIG. 11A illustrates a waveform of the BD signal of the BD sensor 6 illustrated in FIG. 10A, FIG. 11B illustrates a waveform of the BD signal of the BD sensor 6 illustrated in FIG. 10B.

The laser light L to be captured to a light reception portion 6a of the BD sensor 6 is used for scanning by the rotating polygon mirror 4. Reflection conditions of the laser light L until the laser light L is captured to the light reception portion 6a are illustrated in FIGS. 10A and 10B. Referring to FIG. 10A, laser light L1 is light at the timing of incidence to the light reception portion 6a, and laser light L2 is light at the timing after a fixed time period has elapsed since the timing of incidence of the laser light L1. The laser light L2 leads the laser light L1 by a light angle of θ1. The side walls 36a and 37a are side walls on the downstream side of the BD optical path of the optical box 29 in the rotational direction. The side walls 36a and 37a of the optical box 9 formed obliquely to the surface of the substrate 7 prevent the laser light L2 from traveling straight toward the BD sensor 6. Referring to FIG. 10B, laser light L11 is light at the timing of incidence to the light reception portion 6a, and laser light L22 is light at the timing after a fixed time period has elapsed since the timing of incidence of the laser light L11. The laser light L22 leads the laser light L11 by a light angle of θ2. The configuration illustrated in FIG. 10A differs from the configuration illustrated in FIG. 10B in the state of the inner wall 7a. More specifically, the inner wall 7a of the through-hole 13 of the substrate 7 illustrated in FIG. 10A is covered by the positioning projections 37 of the optical box 29 while the inner wall 7a illustrated in FIG. 10B is exposed to the laser light L. Since the through-hole 13 and outer shape of the substrate 7 are normally formed by pressing, the inner wall 7a and edge surfaces are perpendicular to a substrate surface 7c of the substrate 7. On the other hand, as illustrated in FIG. 10A, since the optical box 29 is manufactured by injection molding of resin, the optical box 29 is highly flexible in angles and shapes as with the side walls 36a or 37a. Generally, an optical box is made of black resin with additive fillers such as a glass fiber to improve the strength, and therefore provides non-glossy surfaces hardly having reflectiveness. Therefore, although the quantity of re-incidence light is small even in the form according to the first embodiment, geometric measures may be taken for re-incidence of reflected light regardless of the surface reflectance, like the second embodiment.

Figure 11B:
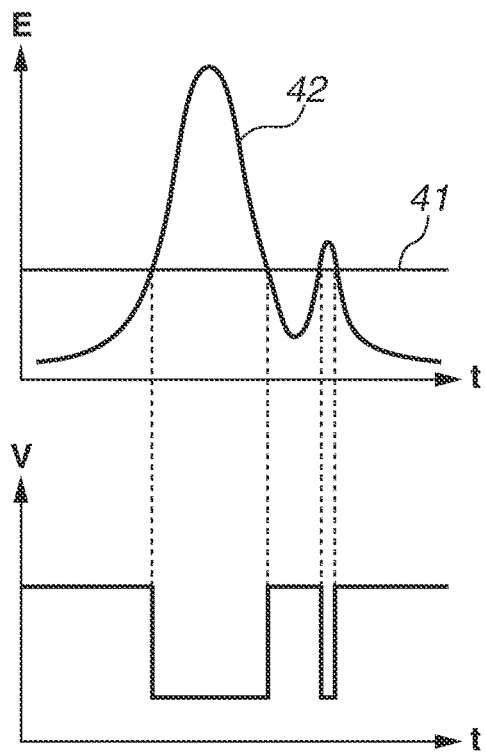
FIG. 11B illustrates a waveform of a horizontal synchronization signal and a pulse signal according to the comparative example.

Referring to the graphs illustrated in FIGS. 11A and 11B, the horizontal axis is assigned time t. The top graph in FIG. 11A illustrates a waveform 40 of the light quantity E assigned to the vertical axis. When the laser light L starts entering the light reception portion 6a of the BD sensor 6, the waveform 40 starts rising. When the laser light L reaches the center of the light reception portion 6a, i.e., at a timing when the light flux enters the light reception portion 6a to the maximum extent, the light quantity E is maximized. The bottom graphs in FIGS. 11A and 11B illustrate a signal level V assigned to the vertical axis. Referring to the top graphs in FIGS. 11A and 11B, the circuit is configured to change the signal level V when the waveforms 40 and 42 pass through a set threshold value 41. As illustrated in FIG. 10A, the laser light L2 which leads the laser light L1 entering the light reception portion 6a by a light angle of θ1 is approximately parallel to the side wall 37a. Therefore, the laser light L2 is reflected by neither the side wall 37a of the projections 37 nor the inner wall 7a of the through-hole 13 of the substrate 7. Therefore, the BD signal output from the BD sensor 6 has the waveform 40 as illustrated in FIG. 11A. As illustrated in FIG. 11A, when the laser light L1 enters the light reception portion 6a of the BD sensor 6, the waveform 40 rises in the shape of the Gaussian distribution. When the waveform 40 exceeds the set threshold value 41, a pulse signal is output as illustrated by the bottom graph illustrated in FIG. 11A. On the other hand, as illustrated in FIG. 10B, when the inner wall 7a of the substrate 7 is exposed when viewed from the side of the rotating polygon mirror 4 of the optical box 29, the laser light L22 is slightly reflected by the inner wall 7a and re-enters the light reception portion 6a. If light reflected by an unexpected portion re-enters the light reception portion 6a, the waveform 42 provides two different mountains, as illustrated in the top graph in FIG. 11B, and accordingly a pulse signal is also output twice as illustrated in the bottom graph in FIG. 11B since a pulse signal is output when the waveform 42 exceeds the threshold value 41. When pulse signals are continuously output, an image controller may incorrectly detect the timing for starting image writing, possibly affecting the position for starting image writing. More specifically, there may be a deviation of the irradiation position of the surface as a scanned surface of the photosensitive drum 103 as a scanned member. Therefore, it is necessary to avoid light re-incidence to the light reception portion 6a of the BD sensor 6. When rotational speed control is performed on the deflector 5 based on the BD signal, if pulse signals are continuously output, the rotational speed is incorrectly detected, and a stable rotational speed is not achieved. Accordingly, vertical lines fluctuations, what is called jitter, may occur in an image.

As described above, the present embodiment allows restraining a deviation of the position of the BD sensor 6 for generating the BD signal to prevent a deviation of the generation timing of the BD signal for controlling the position for starting image writing. The present embodiment further allows forming the side wall 36a as the optical path for light incidence to the BD sensor 6 of the optical box 29 in suitable angle and shape to prevent light incidence to the inner wall 7a of the substrate 7. This makes it possible to restrain light re-incidence to the light reception portion 6a of the BD sensor 6 to prevent a deviation of the output timing due to incorrect detection of the BD signal to a further extent, thus achieving image formation with a stable position for starting image writing.

As described above, the present disclosure makes it possible to attach a detection unit to an optical box with sufficient accuracy.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2018-083812, filed Apr. 25, 2018, which is hereby incorporated by reference herein in its entirety.

What is claimed is:
1. An optical scanning apparatus comprising:
 a light source configured to emit laser light;
 a deflector configured to deflect the laser light emitted from the light source for scanning;
 a detection unit configured to detect the laser light to control an irradiation position on a scanned surface of the laser light deflected by the deflector;
 a substrate, wherein the detection unit is attached to, and electrically connected to, the substrate; and
 an optical box configured to store the deflector,
 wherein the substrate is attached to the optical box and provided with a through-hole through which laser light deflected by the deflector passes, wherein the detection unit is attached to the substrate to receive laser light that has passed through the through-hole, wherein the optical box is provided with a passing portion for guiding the laser light deflected by the deflector to the detection unit, and provided with protruded portions disposed around the passing portion, through which the laser light is to pass, and protruded toward the substrate side, and wherein the substrate is attached to the optical box in a state where the protruded portions are engaged with walls forming the through-hole of the substrate.

2. The optical scanning apparatus according to claim 1, wherein the protruded portions serve as positioning members for positioning the substrate with respect to the optical box while in contact with the walls.

3. The optical scanning apparatus according to claim 1, wherein the protruded portions position the substrate with respect to the optical box in a direction parallel to a line connecting the light source and the detection unit.

4. The optical scanning apparatus according to claim 1, wherein a length of the protruded portions, in a direction perpendicularly intersecting with a line connecting the light source and the detection unit, is shorter than a diameter of the through-hole.

5. The optical scanning apparatus according to claim 1, wherein an inner wall forming the passing portion has a first inner wall parallel to a straight traveling direction of the laser light advancing toward the detection unit.

6. The optical scanning apparatus according to claim 5, wherein the inner wall forming the passing portion has a second inner wall different from the first inner wall parallel to the straight traveling direction of the laser light advancing toward the detection unit.

7. The optical scanning apparatus according to claim 6, wherein the first and the second inner walls are disposed to face each other along a line connecting the light source and the detection unit.

8. The optical scanning apparatus according to claim 5, wherein the first inner wall is inclined with respect to a line connecting the light source and the detection unit.

9. The optical scanning apparatus according to claim 1, wherein a connector for electrically connecting with (i) a circuit provided on other than the substrate, (ii) the detection unit, (iii) the light source, and (iv) a control unit for controlling the light source are disposed in this order along a line connecting the light source and the detection unit.

10. The optical scanning apparatus according to claim 1, wherein the light source is attached to the substrate.

11. An image forming apparatus for forming a toner image on a recording medium, the image forming apparatus comprising:

a photosensitive member;

a developing unit configured to develop an image formed on the photosensitive member to the toner image;

a transfer unit configured to transfer the toner image from the photosensitive member to the recording medium; and an optical scanning unit configured to scan the photosensitive member by a laser light in accordance with image information, wherein the optical scanning unit includes:

a light source configured to emit laser light, a deflector configured to deflect the laser light emitted from the light source for scanning, a detection unit configured to detect the laser light to control an irradiation position on a scanned surface of the laser light deflected by the deflector, a substrate, wherein the detection unit is attached to, and electrically connected to, the substrate, and an optical box configured to store the deflector, wherein the substrate is attached to the optical box and provided with a through-hole through which laser light deflected by the deflector passes, wherein the detection unit is attached to the substrate to receive laser light that has passed through the through-hole, wherein the optical box is provided with a passing portion for guiding the laser light deflected by the deflector to the detection unit, and provided with protruded portions disposed around the passing portion, through which the laser light is to pass, and protruded toward the substrate side, and wherein the substrate is attached to the optical box in a state where the protruded portions are engaged with walls forming the through-hole of the substrate.

* * * * *